United States Patent [19]

Visnic et al.

[11] Patent Number: 4,744,383
[45] Date of Patent: May 17, 1988

[54] THERMALLY ACTIVATED VALVE

[75] Inventors: James E. Visnic; Kevin M. Johnston, both of West Lafayette, Ind.

[73] Assignee: Aluminum Company of America, Pittsburgh, Pa.

[21] Appl. No.: 43,830

[22] Filed: Apr. 29, 1987

[51] Int. Cl.⁴ ............................................. F16K 17/14
[52] U.S. Cl. ........................................ 137/72; 137/74; 220/89 B
[58] Field of Search .......................... 220/89 A, 89 B; 137/68.1, 72, 74

[56] References Cited

U.S. PATENT DOCUMENTS

| 195,367 | 9/1877 | Hiller | 137/74 X |
| 2,356,283 | 8/1944 | Steins | 220/89 B UX |

FOREIGN PATENT DOCUMENTS

| 504257 | 4/1939 | United Kingdom | 137/72 |
| 715109 | 9/1954 | United Kingdom | 137/72 |

Primary Examiner—Harold W. Weakley
Attorney, Agent, or Firm—Thomas J. Connelly

[57] ABSTRACT

A thermally activated valve is disclosed for attachment to a pressurized vessel such that substances contained therein can be released at a selected temperature value. The valve includes a body having an inlet and an outlet in fluid communication with each other. The inlet fluidly communicates with the interior of the pressurized vessel while the outlet is in communication with an area having a lower pressure value. Secured in the outlet is an insert having a stem. The stem has a helical groove formed about its outer periphery and has at least one small aperture which is in communication with the helical groove. The insert cooperates with the body to form a helical passageway therethrough. Positioned within the helical passageway is a material for normally blocking fluid flow therethrough which is fusible at a selected temperature to permit fluid flow therethrough. The helical passageway cooperates with the small aperture formed in the stem to extend the life of the valve by inhibiting the extrusion of the fusible material.

9 Claims, 2 Drawing Sheets

THERMALLY ACTIVATED VALVE

FIELD OF THE INVENTION

This invention relates to a thermally activated valve for attachment to a pressure vessel which can provide an outlet for the pressurized substance once a predetermined temperature value is reached.

BACKGROUND OF THE INVENTION

Pressurized containers such as compressed gas containers are normally equipped with temperature or pressure activated valves. Once the pressure within the container rises above a predetermined value, the pressure activated valve will open to allow the internal gas to escape. Such containers can also be subjected to extreme heat, either through the action of a fire or otherwise, and the pressure within the container can increase as the temperature increases. If the gas is not allowed to vent, the pressure can build until the stresses exerted on the inside walls of the container exceed the strength of the container itself. At this point, the cylinder could rupture explosively releasing the contents and potentially some shrapnel. In the case of a fire, it is possible that the pressurized gas stored within the container can be heated to an extreme temperature very quickly, causing the container to explode even though the pressure activated valve has opened. The reason for this is that the gas cannot escape fast enough to prevent an explosion. Also, for some partially filled aluminum cylinders, the walls of the cylinders can soften and rupture even when the pressure within the cylinder is below the relief setting on the pressure activated valve.

To avoid such catastrophic failures, various types of safety relief valves have been invented. U.S. Pat. Nos. 2,040,776; 3,472,427; and 4,059,125 teach three different types of relief valves having a fusible material which can be ejected under extreme temperature or pressure conditions. U.S. Pat. No. 4,352,365 teaches a safety valve which can be activated by either pressure or temperature. One drawback of these valves is that the fusible material tends to extrude out of the bore after a relatively short period of time. Such extrusion can cause leakage and premature failure of the valve itself. Other U.S. patents of interest include: 1,211,173; 1,303,248; 1,876,938; 1,984,375; 2,020,075; 3,554,227; 4,335,734; 4,407,432; and 4,506,423. However, some of these devices have proved costly to manufacture and some are ineffective at high temperatures over long time periods.

Now a thermally activated valve has been invented which will essentially prevent a fusible material from extruding out of a uniquely designed helical passageway until a selected temperature value has been reached or exceeded.

SUMMARY OF THE INVENTION

Briefly, the present invention relates to a thermally activated valve for attachment to a container which houses a pressurized liquid or gas. The valve is designed to open at a selected temperature and allow the pressurized substance to be released to the atmosphere or a lower pressure area thereby preventing rupture of the container. The thermally activated valve includes a body having an inlet and an outlet in fluid communication with each other. The inlet is attached to the container while the outlet is in communication with the atmosphere or a lower pressure area. An insert is secured to the outlet and includes a stem having a helical groove formed in the outer periphery thereof. The insert cooperates with the body to form a helical passageway. A fusible material is positioned within the passageway for normally blocking fluid flow therethrough. At a selected temperature, the material becomes fusible thereby opening the passageway to permit the pressurized substance to be released. Preferably, the outlet opening of the insert is smaller than the helical passageway thereby causing the fusible material to exhibit shear deformation which inhibits expulsion.

The general object of this invention is to provide a thermally activated valve for a pressure vessel. A more specific object of this invention is to provide a thermally activated valve having a fusible material which exhibits a longer life period and is capable of withstanding higher pressures before the fusible material starts to extrude out.

Another object of this invention is to provide a thermally activated valve which is simple in construction and inexpensive to produce.

Still another object of this invention is to provide a thermally activated valve which contains a helical passageway separated by a plurality of small apertures at each end thereof which necessitate forced shear deformation of the fusible material which inhibits expulsion.

A further object of this invention is to provide a thermally activated valve which can be used on pressurized cylinders constructed of aluminum, Kevlar, plastic or other material subject to thermal degradation.

Other objects and advantages of the present invention will become more apparent to those skilled in the art in view of the following description and the accompanying drawings.

DETAILED DESCRIPTION OF THE PREFERRED EMBODIMENTS

Figure 1:
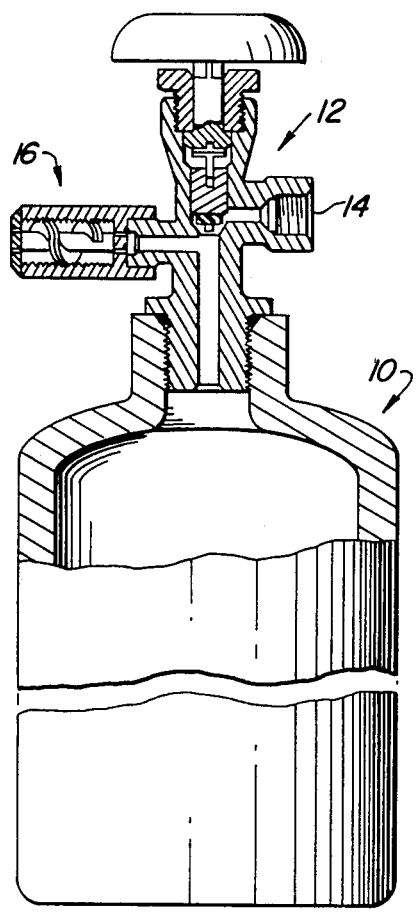
FIG. 1 is an assembly view of a pressurized cylinder having a flow control valve attached thereto which incorporates the thermally activated valve of this invention.

Referring to FIG. 1, a pressure vessel 10 is shown having a flow control valve 12 attached to an end thereof. The pressure vessel 10 can be a pressurized cylinder constructed of materials such as aluminum, Kevlar, plastic or other material subject to thermal degradation. The vessel 10 is designed to store or contain a pressurized liquid or gas, for example hydraulic fluid, natural gas, industrial gas, nitrogen, oxygen, etc., at a specific service pressure. A service pressure of at least 3,000 psig at 70° F. when fully loaded is a maximum standard for some industrial gases. Preferably, the vessel 10 can hold a pressurized substance at 12,000 psig at ambient temperature and up to 6,000 psig at 180° F. with a useful life of at least 2.5 months. Today there are numerous uses for high pressure cylinders to store gases for industrial and medical uses, and specialty gases used to power vehicles, for beverage dispensers, for aerospace applications and for use on oil rigs.

The flow control valve 12 contains an outlet 14 as well as internal valving and passageways (not shown) which permits a substance stored within the pressure vessel 10 to be expelled to the atmosphere or to an area or chamber having a lower pressure value. The flow control valve 12 can also contain an internal structure which permits a thermally activated valve 16 to be attached thereto. The thermally activated valve 16 can be directly attached to an end of the pressure vessel 10 if desired.

Figure 2:
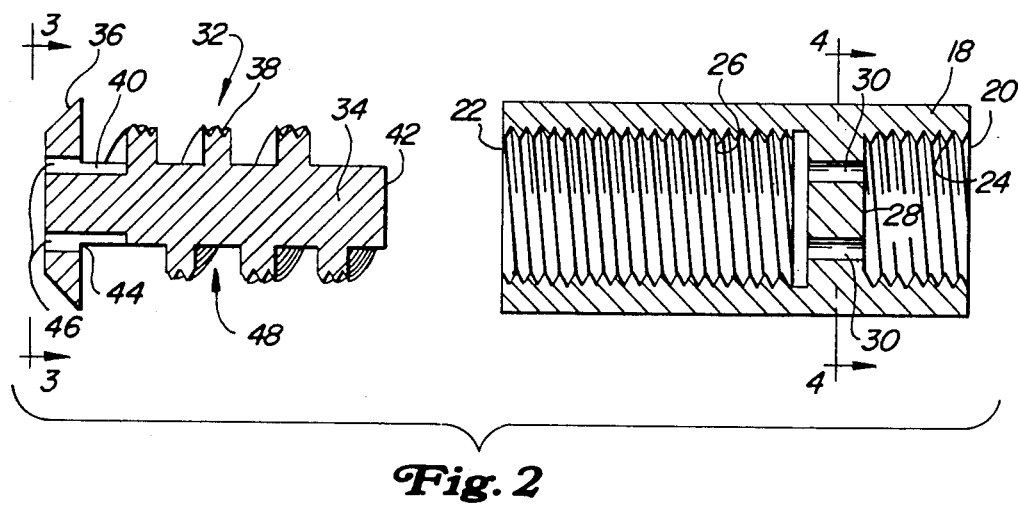
FIG. 2 is an exploded view of a thermally activated valve.

Referring to FIG. 2, the thermally activated valve 16 has a body 18 with an inlet 20 and an outlet 22 formed therein. The inlet 20 is preferably a bore having a screw thread 24 formed about its inner periphery. The screw thread 24 permits the body 18 to be threaded onto the vessel 10 or onto a flow control valve 12. In either case, the inlet 20 will be in fluid communication with the interior of the pressure vessel 10. The outlet 22 is in communication with the atmosphere or an area or chamber having a lower pressure value. The outlet 22 can be in the form of an internal bore which has a screw thread 26 formed about its inner periphery. The body 18 further contains a wall 28 which has at least one, and preferably two or more, small apertures 30 formed therethrough which fluidly connects the inlet 20 with the outlet 22. The apertures 30 can have a cross-sectional area which is substantially less than the cross-sectional area of the outlet 22 if desired.

An insert 32 is designed to be secured within the outlet 22 of the body 18. As shown, the insert 32 contains an elongated stem 34 having a head 36, which can be an enlarged head, formed on an end thereof. The stem 34 contains an external screw thread 38 which is formed along a portion of its length which is designed to mate with the screw thread 26. However, in place of the screw threads 26 and 38, it is possible to press fit the insert 32 into the outlet bore 22 or to secure it in place by means of an adhesive or by using another type of mechanical fastener. Also formed in the stem 34 is a helical groove 40 which extends below the root of the screw thread 38. The helical groove 40 preferably extends from an inner end 42 of the stem 34 to a point 44 located adjacent to the head 36. At the point 44, at least one, preferably two, and most preferably four or more small apertures 46 are formed through the head 36 which cooperate with the helical groove 40 to provide a through passageway. The greater portion of the passageway 48 is helical in configuration and has a circular arc of at least 360°, preferably 720° and more preferably greater than 720°. It is also possible to form the helical passageway 48 in a solid body and avoid the use of the insert 32. In such a case, the body and passageway can be cast formed.

Figure 3:
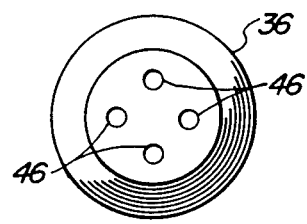
FIG. 3 is an end view taken along line 3—3 of FIG. 2.
Figure 4:
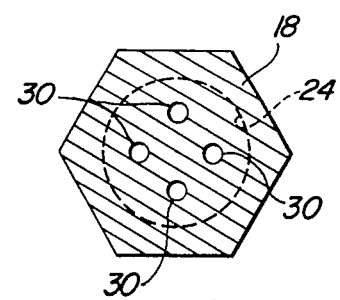
FIG. 4 is a sectional view taken along line 4—4 of FIG. 2.

It should be noted that the apertures 30, which are formed in the body 18, can be the same size and can be arranged in the same configuration as the apertures 46 formed in the insert 32. In FIG. 3, four apertures 46 are shown arranged in a similar fashion to the arrangement of the apertures 30 shown in FIG. 4. The only limitation in this regard is that at least one and preferably all of the apertures 30 are in alignment with a portion of the helical groove 40. This will assure that the passageway 48 provides a flow path through the body 18 such that a liquid or gas contained within the pressure vessel 10 can be released once the passageway 48 is opened.

Figure 5:
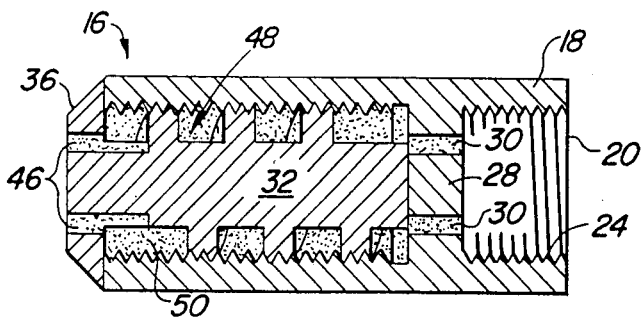
FIG. 5 is a cross-sectional view of the assembled thermally activated valve showing the helical passageway blocked by a fusible material.

Referring to FIG. 5, the thermally activated valve 16 further contains a fusible material 50 which is deposited in the apertures 30 and 46 as well as in the helical groove 40 such that the entire helical passageway 48 is blocked off. The fusible material 50 can be a white lead or a fusible eutectic alloy having a melting point at a particular temperature or within a particular temperature range. Such fusible alloys are supplied by Cerro Metal Products, a division of the Marmon Group, Inc., P.O. Box 388, Bellefonte, Pa. 16823. The fusible alloys normally include bismuth and antimony which are mixed with lead, tin, cadmium or indium. The eutectic alloys have the unique characteristic of having a melting temperature which coincides with their freezing temperature or, stated another way, there is no freezing range between liquidus and solidus. It is also possible to use a synthetic resin such as fluoride-containing polymers, nylon, etc. as the fusible material 50. Experimentation has shown that for use in an aluminum cylinder, it is preferable to use a fusible material 50 having a melting point above 200° F., preferably at either 212° F. or 217° F.

Figure 6:
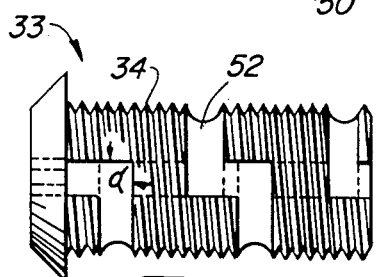
FIG. 6 is an alternative embodiment of the insert having a groove formed therein with at least one 90° angular bend formed along its length.

Referring to FIG. 6, an alternative designed insert 33 is shown having a stem 34 with a step-shaped groove 52 formed therein. The step-shaped groove 52 has at least one angular bend formed along its length which is depicted by the angle alpha ($\alpha$). Although alpha is shown as a 90° angle, it can be any angle between 0° and 180°. The angular turn or bend assists in preventing extrusion of the fusible material 50 from the groove 52 over extended periods of time.

Figure 7:
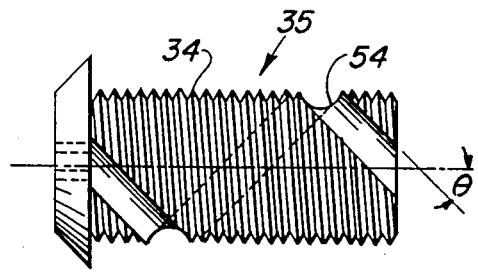
FIG. 7 is still another embodiment of the insert showing a helical groove formed at a desired angle.

Referring to FIG. 7, another insert 35 is shown wherein the stem 34 has a groove 54 formed therein. The groove 54 is cut at an angle of either less than 40° or more than 55°, preferably greater than 65°, as measured relative to a longitudinal centerline. This angle, represented by the symbol theta ($\theta$), has been found to be advantageous in prolonging the period of time it takes for the fusible material 50 to extrude out of the groove 54.

Figure 8:
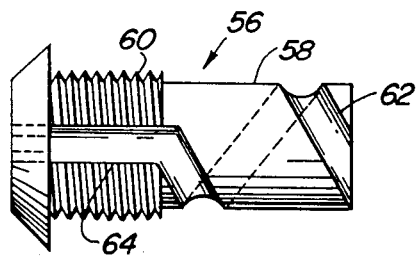
FIG. 8 is still another embodiment of the insert showing a helical groove terminating into an axial groove segment adjacent the head end of the stem.

Referring to FIG. 8, still another insert 56 is shown having a stem 58 which is only partially threaded at 60. By only partially threading the insert 56 the cost of producing it can be substantially reduced. The insert 56 also has a helical groove 62 formed therein which has an axially oriented segment 64 formed along its length. It should be noted that although three alternative embodiments have been depicted herein, it is possible that other embodiments can also be utilized.

Figure 9:
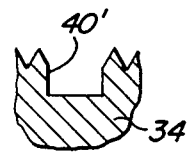
FIG. 9 is a cross-sectional view of a portion of the helical groove showing a rectangular cross-sectional configuration.
Figure 10:
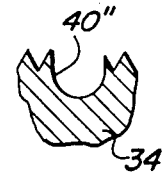
FIG. 10 is a cross-sectional view of a portion of the helical groove showing a semi-circular cross-sectional configuration.

Referring now to FIGS. 9 and 10, the helical groove 40 can have a cross-sectional configuration which will assist in reducing extrusion of the fusible material 50. In FIG. 9 the helical groove 40 is shown having a rectangular cross-section 40' while in FIG. 10 the helical groove 40 is shown having a semi-circular cross-section 40". The surface of the helical groove 40 can also be roughened or coated with a material so as to cause it to be coarse. Such roughness or coarseness will assist in holding the fusible material 50 within the helical groove 40 thereby prolonging the period of time before extrusion will occur. It should also be noted that extending the length of the helical passageway 48 will also increase the force needed to extrude the fusible material 50.

Figure 11:
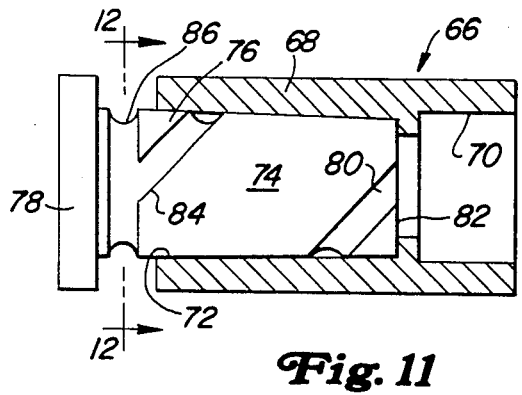
FIG. 11 is an alternative embodiment of the thermally activated valve showing the insert press fitted into the body and having the helical groove intersecting a circular groove formed about the insert.
Figure 12:
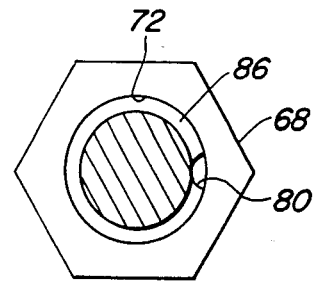
FIG. 12 is a cross-sectional view taken along line 12—12 of FIG. 11 showing the circular groove.

Referring now to FIGS. 11 and and 12, an alternative thermally activated valve design 66 is depicted having a body 68 with an inlet 70 and an outlet 72 formed therein. Both the inlet 70 and the outlet 72 are in fluid communication with each other. Press fitted into the outlet 72 is an insert 74 having an elongated stem 76 with a head 78 formed at one end. Formed about the circumference of the stem 76 is a tapered helical groove 80 having its head end communicating with an inner end 82 of the insert 74. The helical groove 80 can be tapered along only a portion of its length if desired and the taper can range from 1 to 30°. An opposite or narrow end 84 of the groove 80 intersects a circular groove 86 formed about the outer periphery of the stem 76. The circular groove 86 is located adjacent to the head 78 and provides an opening such that a substance stored within a pressure vessel can be released. Preferably, the circular groove 86 is aligned perpendicularly to the helical groove 80 and has a smaller cross-section than that of the helical groove 80. It is possible for the cross-section of the circular groove 86 to be equal to or larger than that of the helical groove 80 but in these configurations the shear deformation of the fusible material 50 may not be as great.

While the invention has been described in conjunction with several specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:
1. A thermally activated valve comprising:
 a body having an inlet and an internally threaded outlet in fluid communication with each other, said inlet adapted to be attached to a pressure source and said outlet communicating with an area having a lower pressure value than said pressure source;
 (b) an insert having a threaded stem with an enlarged head formed on an end thereof, said head having at least one aperture formed therethrough, said stem being threadably secured to said outlet with said enlarged head preventing said insert from completely entering said body, said stem further having a groove formed in its outer periphery which extends from said aperture formed in said head to an opposite end of said insert, the bottom of said groove extending below the root of said thread, said groove cooperating with an internal surface of said body and with said aperture to form a passageway through said valve; and
 (c) material means for normally blocking fluid flow through said passageway and being fusible at a selected temperature to permit fluid flow from said pressure source to said area having a lower pressure value.

2. The valve of claim 1 wherein the cross-sectional area of said groove is larger than the cross-sectional are of said aperture fromed in said head.

3. The valve of claim 1 wherein said groove has a helical configuration.

4. The valve of claim 1 wherein the cross-sectional area of said groove is substantially larger than the cross-sectional area of said threads.

5. A thermally activated valve for attachment to a container which will permit a pressurized substance stored within said container to be released to the atmosphere once a selected temperature value has been reached, said valve comprising:
 (a) a body having a threaded inlet and a threaded outlet separated by a wall having at least one aperture formed therethrough, said inlet adapted to be attached to said container and communicate with the interior thereof and said outlet communicating with the atmosphere;
 (b) an insert having a threaded stem with an enlarged head formed on an end thereof, said head having at least two apertures formed therethrough, said stem being threadably secured to said outlet with said enlarged head preventing said insert from completely entering said body, said stem further having a groove formed in its outer periphery which extends along the length thereof, the bottom of said groove extending below the root of said thread, said groove cooperating with an interal surface of said body and with said apertures formed in said wall and in said head to form a passageway through said insert; and
 (c) material means for normally blocking fluid flow through said passageway and being fusible at a selected temperature to permit fluid flow from said container to the atmosphere.

6. The valve of claim 5 wherein the cross-sectional area of said groove is larger than the cross-sectional area of said apertures formed in said wall and in said head.

7. The valve of claim 5 wherein at least a portion of said groove has a helical configuration.

8. The valve of claim 5 wherein at least a portion of said groove lies parallel to the longitudinal axis of said insert.

9. A thermally activated valve for attachment to a container capable of storing a pressurized substance, said valve enabling said pressurized substance to be released without catastrophic rupture of said container once a selected temperature value has been readhed, said valve comprising:
 (a) a body having an inlet and an outlet separated by a wall having at least one aperature formed therethrough, said inlet having an internal screw thread for attachment to said container and said outlet having an internal screw thread and being in communication with an area having a lower pressure value than that present in said container;
 (b) an insert having a threaded stem with an enlarged head formed on an end thereof, said head having four apertures formed therethrough, said stem being threadably secured to said outlet with said enlarged head preventing said insert from completely entering said body, said stem further having a helical groove formed in its outer periphery which extends along the length thereof, the bottom of said helical groove extending below the root of said thread, said helical groove cooperating with an internal surface of said body and with said apertures formed in said wall and in said head to form a passageway through said valves; and (c) material means for normally blocking fluid flow through said passageway and being fusible at a selected temperature to permit fluid flow from said container.

* * * * *